(12) United States Patent
Ranjan et al.

(10) Patent No.: US 11,360,498 B2
(45) Date of Patent: Jun. 14, 2022

(54) REFRIGERATION MANAGER TOOL FOR MONITORING AND CONTROLLING DISPARATE REFRIGERATION SYSTEMS AT AN INSTALLATION SITE

(71) Applicant: Honeywell International Inc., Morris Plains, NJ (US)

(72) Inventors: Prabhat Ranjan, Bangalore (IN); Jerry Marti, West Salem, OH (US); Ripunjeet Dutta, Bangalore (IN); Jitendra Jain, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 228 days.

(21) Appl. No.: 16/788,599

(22) Filed: Feb. 12, 2020

(65) Prior Publication Data

US 2020/0257321 A1 Aug. 13, 2020

Related U.S. Application Data

(60) Provisional application No. 62/805,258, filed on Feb. 13, 2019.

(51) Int. Cl.
*G05D 23/19* (2006.01)
*F25D 3/10* (2006.01)
*F25D 29/00* (2006.01)

(52) U.S. Cl.
CPC ......... *G05D 23/1919* (2013.01); *F25D 3/105* (2013.01); *F25D 3/107* (2013.01); *F25D 29/00* (2013.01); *F25D 2400/14* (2013.01); *F25D 2400/361* (2013.01); *F25D 2600/06* (2013.01)

(58) Field of Classification Search
CPC ..... G05D 23/1919; F25D 3/105; F25D 29/00; F25D 3/107; F25D 2400/14; F25D 2400/361; F25D 2600/06; F25B 49/00
See application file for complete search history.

(56) References Cited

U.S. PATENT DOCUMENTS

| | | | |
|---|---|---|---|
| 6,408,634 B1* | 6/2002 | Choi | F25D 11/022 62/127 |
| 7,658,334 B2* | 2/2010 | Glielmo | G06Q 10/087 236/51 |
| 7,765,819 B2 | 8/2010 | Anell et al. | |
| 7,827,811 B2 | 11/2010 | Ferragut, II et al. | |
| 8,866,753 B2 | 10/2014 | Akbas | |
| 2011/0304466 A1* | 12/2011 | Bair, III | F25D 29/008 340/585 |
| 2017/0184342 A1* | 6/2017 | Tae | G06K 7/10366 |
| 2017/0307239 A1* | 10/2017 | Wallace | F25D 29/00 |
| 2020/0049394 A1* | 2/2020 | Szewerenko | F25B 49/00 |

* cited by examiner

*Primary Examiner* — Ryan W Sherwin
(74) *Attorney, Agent, or Firm* — Seager, Tufte & Wickhem LLP

(57) ABSTRACT

A refrigeration manager that can be used to monitor and control disparate refrigeration systems at a site, even when the refrigeration systems are manufactured by different vendors. The refrigeration manager provides common views for the disparate refrigeration systems, which may help a technician more easily monitor and control the various refrigeration systems at a site.

20 Claims, 19 Drawing Sheets

CIRCUITS
Circuit Status

| CIRCUITNAME | CONTROLTEMP | ACTIVESETPOINT | OPMODE | MODETIME | SYNC DEFROST... | DEFTERMTEMP | DEFPENDING | DEFSCHED TY... | EEPRVALVEPOS | DEFHEATERAM... |
|---|---|---|---|---|---|---|---|---|---|---|
| A01 IC DRS | 0.0°F | -15.00°F | Cooling | 110.0min | | -9.02°F | No | | 0.0V | 0.0A |
| A02 IC DRS | 0.0°F | -12.00°F | Cooling | 1245.0min | | -5.24°F | No | | 0.0V | 0.0A |
| A03 IC DRS | 0.0°F | -12.00°F | Cooling | 153.0min | | -8.31°F | No | | 0.0V | 0.0A |
| A04 IC DRS | 0.0°F | -12.00°F | Cooling | 153.0min | | 90.00°F | No | | 0.0V | 0.0A |
| A05 IC DRS | 0.0°F | -13.00°F | Cooling | 153.0min | | -10.30°F | No | | 0.0V | 0.0A |
| A06 IC DRS | 0.0°F | -12.00°F | Cooling | 153.0min | | 90.00°F | No | | 0.0V | 0.0A |
| A07 DT CFN | 0.0°F | -12.00°F | Cooling | 153.0min | | 90.00°F | No | | 0.0V | 0.0A |
| A08 DT CFN | 0.0°F | -12.00°F | Cooling | 153.0min | | 90.00°F | No | | 0.0V | 0.0A |
| A09 DT CFN | 0.0°F | -12.00°F | Cooling | 153.0min | | 90.00°F | No | | 0.0V | 0.0A |
| A10 DT CFN | 0.0°F | -12.00°F | Cooling | 153.0min | | 90.00°F | No | | 0.0V | 0.0A |
| A11 IC FZR | 0.0°F | -10.00°F | Cooling | 153.0min | | -7.00°F | No | | 0.0V | 0.0A |

CIRCUITS > A01 IC DRS

A01 IC DRS

Configuration  Data Logs  Defrost Schedule

800

Circuit Status

| | | | | |
|---|---|---|---|---|
| Control Temp | 0.00 °F | Defrost Term Temp | 30.0 °F | Defrost Output | false |
| Active Setpoint | -12.00°F | Defrost Pending | No | Evap Fan Output | false |
| Op Mode | Cooling | Next Scheduled Defrost Time | 27-Aug-18 7:00PM IST | LLSV Output | Off |
| Mode Time | 42.0min | EEPR Valve Pos | 0.0V | Last Defrost Duration | 27.2min |
| Avg Evap Press | 0.0 psig | Time Since Last Defrost | 1.15hr | Defrost Amps | 0.0A |
| Evap Fan Amps | 0.00A | Case Lights | Off | | |

Temperature Control Settings

| | | | |
|---|---|---|---|
| Dual Temp Enabled | LT | MT Setpoint | 32.0 °F | Superheat Setpoint | 0.0 °F |
| LT Setpoint | -12.0 °F | Case ShutDown | No | | |
| Lights On Time | 0 | | | | |
| Lights Off Time | 0 | | | | |

Defrost Control Settings

| | | | |
|---|---|---|---|
| Max Defrost Time | 25.0 min | Def Term Setpoint | 30.0 °F | Drip Time | 2.0 min | Fan Delay Time | 10.0 min |
| Defrost Start Time | 1:00 AM | Defrost Per Day | 4 | Defrost Enable | Off | Min Defrost Time | 5 min |
| Pump Out Delay | 0 s | | | | |

FIG. 8

Temperature Control Settings

Dual Temp Enabled
LT ▸

LT Setpoint
-12.0 _____ °F

MT Setpoint
32.0 _____ °F

Superheat Setpoint
0.0 _____ °F

Lights On Time
0 _____

Lights Off Time
0 _____

Case ShutDown
No ▸

Defrost Control Settings

Max Defrost Time
25.0 _____ min

Def Term Setpoint
30.0 _____ °F

Drip Time
2.0 _____ min

Fan Delay Time
10.0 _____ min

Defrost Start Time
1:00 AM _____

Defrost Per Day
4 _____

Defrost Enable
Off ▸

Min Defrost Time
5 _____ min

Pump Out Delay
0 _____ s

Circuit Case Details

| EEV NAME | EEV CASE TEMP | EEV DEF TERM TEMP | EEV VALVE POS | EEV EVAP PRESS | EEV SUPERHEAT READING | EEV RETURN AIR TEMP |
|---|---|---|---|---|---|---|
| A01a IC DRS | -10.30°F | 0.0°F | 0.0% | 0.0psig | 0.0°F | |
| A01b IC DRS | 0.0°F | 0.0°F | 0.0% | 0.0psig | 0.0°F | |
| A01c IC DRS | 0.0°F | 0.0°F | 0.0% | 0.0psig | 0.0°F | |
| A02a IC DRS | -7.8°F | 0.0°F | 0.0% | 0.0psig | 0.0°F | |
| A02b IC DRS | 0.0°F | 0.0°F | 0.0% | 0.0psig | 0.0°F | |
| A03a IC DRS | 0.0°F | 0.0°F | 0.0% | 0.0psig | 0.0°F | |
| A03b IC DRS | -11.92°F | 0.0°F | 0.0% | 0.0psig | 0.0°F | |
| A04a IC DRS | 0.0°F | 0.0°F | 0.0% | 0.0psig | 0.0°F | |
| A04b IC DRS | 0.0°F | 0.0°F | 0.0% | 0.0psig | 0.0°F | |
| A04c IC DRS | 0.0°F | 0.0°F | 0.0% | 0.0psig | 0.0°F | |
| A05a IC DRS | -10.19°F | 0.0°F | 0.0% | 0.0psig | 0.0°F | |
| A05b IC DRS | 0.0°F | 0.0°F | 0.0% | 0.0psig | 0.0°F | |
| A06 IC DRS | 0.0°F | 0.0°F | 0.0% | 0.0psig | 0.0°F | |
| A07 DT CFN | 0.0°F | 0.0°F | 0.0% | 0.0psig | 0.0°F | |
| A08 DT CFN | 0.0°F | 0.0°F | 0.0% | 0.0psig | 0.0°F | |
| A09 DT CFN | 0.0°F | 0.0°F | 0.0% | 0.0psig | 0.0°F | |
| A10 DT CFN | 0.0°F | 0.0°F | 0.0% | 0.0psig | 0.0°F | |
| A11a IC FZR | -7.97°F | 0.0°F | 0.0% | 0.0psig | 0.0°F | |
| A11b IC FZR | 0.0°F | 0.0°F | 0.0% | 0.0psig | 0.0°F | |
| A12 IC FZR | 0.0°F | 0.0°F | 0.0% | 0.0psig | 0.0°F | |
| A13 IC FZR | 0.0°F | 0.0°F | 0.0% | 0.0psig | 0.0°F | |

Alarm Details

| TIME STAMP | ALARM STATE | ACK STATE | ALARM SOURCE | ALARM CLASS | MESSAGE TEXT |
|---|---|---|---|---|---|
| 27-Aug-18 2:48 PM IST | Offnormal | Unacked | OpusNetworkXCM1 | defaultAlarmClass | %blexicon(driver:pingFail)% |
| 24-Aug-18 3:08 PM IST | Offnormal | Unacked | BacnetNetwork Device-42042 RCC-1044 | defaultAlarmClass | %blexicon(driver:pingFail)% |
| 24-Aug-18 3:08 PM IST | Offnormal | Unacked | BacnetNetwork Device-42042 RCC-1044 | defaultAlarmClass | %blexicon(driver:pingFail)% |
| 22-Aug-18 12:17 PM IST | Offnormal | Unacked | BacnetNetwork Device-42042 RCC-1044 | defaultAlarmClass | %blexicon(driver:pingFail)% |
| 22-Aug-18 12:17 PM IST | Offnormal | Unacked | BacnetNetwork Device-42042 RCC-1044 | defaultAlarmClass | %blexicon(driver:pingFail)% |
| 26-Aug-18 1:07 PM IST | Normal | Unacked | OpusNetworkXCM1 | defaultAlarmClass | %blexicon(driver:pingFail)% |
| 24-Aug-18 3:10 PM IST | Normal | Unacked | OpusNetworkXCM1 | defaultAlarmClass | %blexicon(driver:pingFail)% |
| 24-Aug-18 2:16 PM IST | Normal | Unacked | OpusNetworkXCM1 | defaultAlarmClass | %blexicon(driver:pingFail)% |
| 22-Aug-18 12:13 PM IST | Normal | Unacked | OpusNetworkXCM1 | defaultAlarmClass | %blexicon(driver:pingFail)% |

Device Manager

| NAME | STATUS | DEVICE ID | NETWORK | MAC ADDRESS | VENDOR | MODEL | FIRMWARE REV | APP SW VERSION |
|---|---|---|---|---|---|---|---|---|
| LTA | {disabled} | device5 | 3 | 5 | | | | |
| LTB | {disabled} | device3 | 3 | 3 | | | | |
| MTC | {down} | device1 | 3 | 2 | mann | igeration | 1 | |
| MTD | {disabled,down} | device4 | 3 | 4 | | igeration | 1 | |
| A01 IC DRS | {down} | device80071 | 3 | 1 | Manufacturers Name Krac | SPORLAN_S3C | A00194 | FW-P0162 |
| A02 IC DRS | {disabled} | device10021 | 2 | 21 | | | | |
| A03 IC DRS | {disabled} | device10031 | 2 | 31 | | | | |
| A04 IC DRS | {disabled} | device10041 | 2 | 41 | | | | |
| A05 IC DRS | {disabled} | device10051 | 2 | 51 | | | | |
| A06 IC DRS | {disabled} | device10061 | 2 | 61 | | | | |

REFRIGERATION MANAGER TOOL FOR MONITORING AND CONTROLLING DISPARATE REFRIGERATION SYSTEMS AT AN INSTALLATION SITE

This application claims the benefit of U.S. Provisional Patent Application Ser. No. 62/805,258, filed Feb. 13, 2019. U.S. Provisional Patent Application Ser. No. 62/805,258, filed Feb. 13, 2019, is hereby incorporated by reference.

BACKGROUND

The disclosure relates generally to refrigeration systems. Refrigeration systems are commonly used to provide refrigerated cases within a building. The refrigerated cases may take a variety of forms. In some cases, the refrigerated cases may be those commonly found in grocery stores to keep food products refrigerated. In some situations, the refrigerated case may be a walk in refrigerated case. In a typical installation, a rack of compressors is located outside of the building to provide a source of compressed refrigerant to one or more refrigeration circuits inside of the building. Each of refrigerated cases may be associated with a refrigeration circuit.

In many installations, the refrigeration systems are purchased, installed, upgraded and/or maintained by different vendors and at different times. This can make management of the multiple refrigeration systems at a site less efficient and expensive for the facility managers, operators and building owners. In some installations, multiple refrigeration systems are installed each with a different local refrigeration controller. To monitor and maintain such refrigeration systems, each refrigeration system typically has a corresponding application program that interfaces with the local refrigeration controller and is specific to the vendor of that refrigeration system. The application program typically allows a technician to monitor and control various aspects of the corresponding refrigeration system. Because such application programs are often vendor/local controller specific, the application program typically does not allow a technician to monitor and control other refrigeration systems at the site, particularly those manufactured by other vendors. What would be desirable is a refrigeration manager that can be used to monitor and control disparate refrigeration systems at a site, even when the refrigeration systems are manufactured by different vendors. What would also be desirable is a refrigeration manager that provides common views for the disparate refrigeration systems, which may help a technician more easily monitor and control the various refrigeration systems at a site.

SUMMARY

The disclosure relates generally to refrigeration systems, and more particularly, to tools for integrating and controlling disparate refrigeration systems. In an example of the disclosure, an illustrative method for managing two or more refrigeration systems may include communicating with a local controller of the first refrigeration system using a first communication protocol to: (1) receive values of two or more points of the first refrigeration system, wherein at least one of the two or more points represent a temperature and at least another of the two or more points represents a pressure; and (2) send one or more user settings for use by the first refrigeration system. The method may further include communicating with the local controller of the second refrigeration system using a second communication protocol to: (1) receive values of two or more points of the second refrigeration system, wherein at least one of the two or more points represent a temperature and at least another of the two or more points represents a pressure and send one or more user settings for use by the second refrigeration system. The method may further include mapping the two or more points of the first refrigeration system to a defined set of common points, mapping the two or more points of the second refrigeration system to the defined set of common points, and referencing the defined set of common points to display a screen that displays the value of one or more points of the first refrigeration system concurrently with the value of one or more points of the second refrigeration system.

Alternatively or additionally to the foregoing, the screen may display the value of one or more points of the first refrigeration system that represents a temperature concurrently with the value of one or more points of the second refrigeration system that represents a temperature.

Alternatively or additionally to the foregoing, the screen may display the value of one or more points of the first refrigeration system that represents a pressure concurrently with the value of one or more points of the second refrigeration system that represents a pressure.

Alternatively or additionally to the foregoing, the screen may display the value of one or more points of the first refrigeration system that represents a pressure concurrently with the value of one or more points of the second refrigeration system that represents a temperature.

Alternatively or additionally to the foregoing, the screen may be a dashboard screen that includes two or more defined panel regions, wherein a first one of the two or more panel regions displays the value of one or more points of the first refrigeration system concurrently with the value of one or more points of the second refrigeration system.

Alternatively or additionally to the foregoing, the method may further include displaying a first link in the first one of the panel regions of the dashboard screen that, when selected by a user, displays a first screen that displays the value of at least one other of the two or more points of the first refrigeration system.

Alternatively or additionally to the foregoing, the method may further include displaying a second link in the first one of the panel regions of the dashboard screen that, when selected by the user, displays a second screen that displays the value of at least one other of the two or more points of the second refrigeration system.

Alternatively or additionally to the foregoing, the method may further include displaying a trend graph of the value of one or more points of the first refrigeration system in the first one of the two or more panel regions.

Alternatively or additionally to the foregoing, the method may further include communicating with the local controller of the first refrigeration system using the first communication protocol to receive one or more active alarms of the first refrigeration system and communicating with the local controller of the second refrigeration system using the second communication protocol to receive one or more active alarms of the second refrigeration system.

Alternatively or additionally to the foregoing, the method may further include calculating an aggregated number of active alarms of the first refrigeration system and the second refrigeration system and displaying the aggregated number of active alarms in a second one of the panel regions of the dashboard screen.

Alternatively or additionally to the foregoing, the method may further include displaying an alarm link in the second one of the panel regions of the dashboard screen that, when selected by a user, displays an alarm screen that displays the active alarms of the first refrigeration system and/or the active alarms of the second refrigeration system.

Alternatively or additionally to the foregoing, a third panel of the dashboard screen may include a navigation panel that displays a first shortcut to more detailed information about the first refrigeration system and a second shortcut to more detailed information about the second refrigeration system.

Alternatively or additionally to the foregoing, the screen may be web-based and may facilitate monitoring and control over both the first refrigeration system and the second refrigeration system via a common interface from a remote location.

Alternatively or additionally to the foregoing, the method may further include analyzing the received values of the two or more points of the first refrigeration system and the received values of the two or more points of the second refrigeration system to identify lower performing components of the first refrigeration system and the second refrigeration system.

In another example of the disclosure, an illustrative system for managing two or more refrigeration systems may include a controller, a communication port and a memory. The communication port may be configured to communicate with a local controller of a first refrigeration system using a first communication protocol to receive values of two or more points of the first refrigeration system, wherein at least one of the two or more points represent a temperature and at least another of the two or more points represents a pressure, and send one or more user settings for use by the first refrigeration system. The communication port may also be configured to communicate with a local controller of a second refrigeration system using a second communication protocol to receive values of two or more points of the second refrigeration system, wherein at least one of the two or more points represent a temperature and at least another of the two or more points represents a pressure and send one or more user settings for use by the second refrigeration system. The memory may be configured to store a mapping between the two or more points of the first refrigeration system and a defined set of common points, along with a mapping between the two or more points of the second refrigeration system and the defined set of common points. The controller may be configured to reference the defined set of common points and the mappings in the memory to assemble a dashboard screen that displays the value of one or more points of the first refrigeration system concurrently with the value of one or more points of the second refrigeration system.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIGS. 3-11, 12A-12B, 13-16, and 17A-17B show illustrative screens displayed by the illustrative refrigeration management system of FIG. 2.

Figure 1:
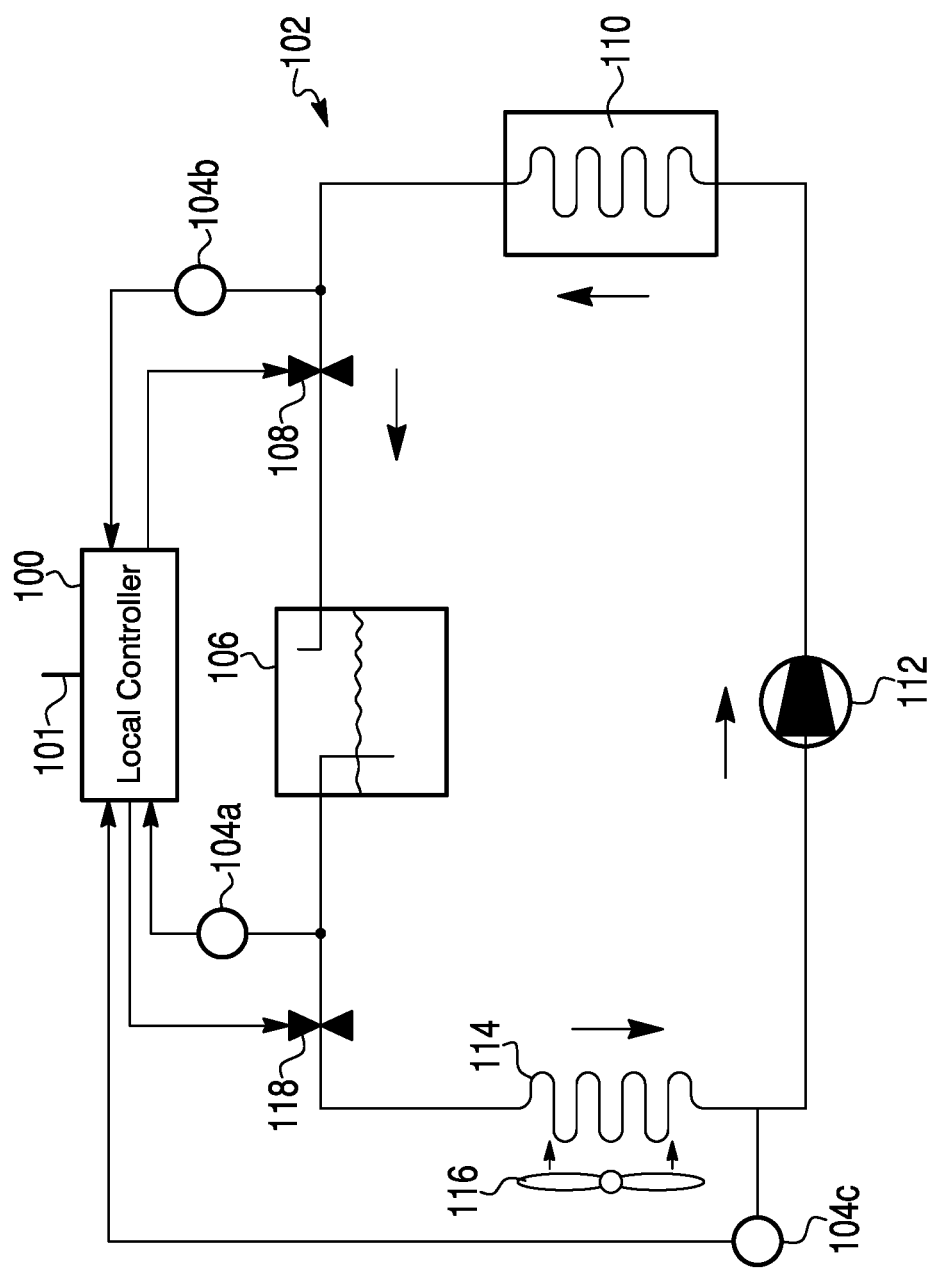
FIG. 1 is a schematic view of an illustrative refrigeration system with a local controller.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The present system and approach may incorporate one or more processors, computers, controllers, user interfaces, wireless and/or wire connections, and/or the like, in an implementation described and/or shown herein. This description may provide one or more illustrative and specific examples or ways of implementing the present system and approach, but this should not be limiting. There may be numerous other examples or ways of implementing the system and approach.

A refrigeration system manager is disclosed to monitor and/or control disparate refrigeration systems. In many cases, the disparate refrigeration systems may include refrigeration equipment from different vendors. The refrigeration system manager may include a built-in framework that is configured to monitor, control and manage disparate, multi-vendor refrigeration systems. In some cases, the refrigeration system manager may provide a set of drivers, templates and libraries to interface with various installed refrigeration systems easily and in a consistent manner independent of the underlying refrigeration control system vendor or vintage. In one example, the refrigeration system manager can be integrated with Novar Logic One/Spectrum refrigeration control system, Novar Opus control systems and native BACnet controllers by Elliwell and Sporlan. These are just example, and it is contemplated that other control systems can also be integrated.

In some cases, the refrigeration system manager may provide a modelling framework to easily tag and model refrigeration equipment and points which may enable a dynamic and configurable web UI which is model driven, and may allow common views for underlying vendor systems. A point may be considered any input or output used to control the overall or specific performance of the refrigeration equipment. Example points include temperatures, pressures and set points. These are just examples. Also, the raw vendor specific data, with added model contextual information may make it easier for writing analytic rules and driving insights from the data from the underlying refrigeration systems.

In some cases, the refrigeration system manager may provide edge analytics to determine case and system performance results, sometimes displayed in a dashboard for easy consumption by a user. In some cases, the refrigeration system manager may be built using an abstraction layer of connected building API's (Application Program Interface's), which may make the User Interface layer (e.g., UI/UX layer) independent of the underlying system (e.g., an underlying Niagara N4 system) and may allow the refrigeration system manager to be hosted on-premises or in cloud. The refrigeration system manager may also provide a mechanism to automatically update the user interface with real-time values whenever there is a change in the configuration in the underlying system (e.g., Niagara system) or the value of a point changes.

In some cases, the refrigeration system manager may include the Opus Refrigeration Library (ORL) allowing integration and direct use of native BACnet refrigeration system local controller devices. This may facilitate the refrigeration system manager in having full control of the various refrigeration systems by having direct management/control of the corresponding BACnet local controllers, for example, specified for a rack, condenser, circuit/case, and/or other controls. This may help a user select a current state of the art BACnet controllers and are not tied to a specific controller vendor. In some cases, the refrigeration system manager may provide a mechanism to export and render graphics pages (e.g., Niagara Px pages) as an HTM5 or other renderable widget and include it as a part of overall UI framework.

FIG. 1 is a schematic view of an illustrative refrigeration system 102 with a local controller 100. The local controller 100 includes an I/O port 101 that communicates using a communication protocol. In some cases, the communication protocol may be an industry standard communication protocol such as BACNET, and in other cases it may be a proprietary communication protocol unique to the manufacturer of the local controller 100 and/or refrigeration system 102. The I/O port 101 of the local controller 100 facilitates access to, control of, and/or external communication to/from the refrigeration system 102. The local controller 100 may also be used to control the refrigeration system 102. The local controller 100 can be integrated into the refrigeration system 102, or may be separate from the refrigeration system 102 and communicate with refrigeration system 102 via a wired or wireless interface. In some cases the local controller 100 may be a Novar Logic One/Spectrum refrigeration control system, or a Novar Opus control system. In some cases, the local controller 100 may include an Elliwell and/or Sporlan refrigeration controller. These are just examples.

In some cases, the illustrative refrigeration system 102 includes a liquid refrigerant 106, a throttling valve 108, a condenser 110, a compressor 112, an evaporator 114, and an expansion valve 118. The local controller 100 can control the operation of the compressor 112, the throttling valve 108 and the expansion valve 118, as well as other components as desired. The illustrative refrigeration system 102 can be a refrigeration system of, for example, a retail store, such as a supermarket or grocery store. The refrigeration system 102 can be, for example, a refrigeration and/or freezer display case and/or walk-in cooler of a retail store. In some cases, the refrigeration system 102 may include a single display case or walk-in cooler, or multiple display cases or walk-in coolers. It is noted that while one refrigeration system (e.g., refrigeration system 102) is shown in FIG. 1, embodiments of the present disclosure are applicable to a plurality of refrigeration systems. In some cases, each refrigeration system may be controlled by a corresponding local controller designated specifically for that refrigeration system. However, this is not required. In some instances, a single local controller (e.g., the local controller 100) may be used to control several refrigeration systems.

A refrigerant can flow (e.g., circulate and/or cycle) through refrigeration system 102 in a counterclockwise direction, as indicated in FIG. 1. For example, the refrigerant can enter the compressor 112 as a superheated vapor. The compressor 112 can compress the refrigerant to a higher pressure. The hot, compressed vapor can then flow (e.g., be routed) to the condenser 110. The condenser 110 can condense (e.g., cool) the refrigerant (e.g., superheated) vapor into a liquid. For example, the condenser 110 can include a coil or tubes, and the condenser 110 can condense the refrigerant vapor into a liquid by flowing the refrigerant through the coil or tubes while flowing cool water or cool air across the coil or tubes, such that heat from the refrigerant is carried away by the water or air. The condensed liquid refrigerant can then flow through the throttling valve 108 and be received by (e.g., input into) a liquid refrigerant receiver 106. The liquid refrigerant receiver 106 can be a pressure accumulation vessel that holds (e.g., stores) excess liquid refrigerant present in the refrigeration system 102. The liquid refrigerant receiver 106 can include an upstream port through which the condensed liquid refrigerant enters (e.g., is input), and a downstream port through which the condensed liquid refrigerant exits (e.g., is output). The upstream port can have a nozzle to promote mixing and heat exchange of the input refrigerant within a vapor region, and the downstream port can have a pipe reaching to the bottom of a liquid region. Before the condensed liquid refrigerant is received by the liquid refrigerant receiver 106, the throttling valve 108 can adjust the pressure of the condensed liquid refrigerant to remove heat from the condensed liquid refrigerant. That is, the controller 100 can control the throttling valve 108 to adjust the pressure of the condensed liquid refrigerant to subcool the condensed liquid refrigerant.

The throttling valve 108 can be any type of valve that can obstruct the flow of the condensed liquid refrigerant to adjust its pressure. For example, the throttling valve 108 can be a modulating electronic throttling valve 108. In some embodiments, the throttling valve 108 can subcool the condensed liquid refrigerant by a determined amount. For instance, controller 100 can operate throttling valve 108 to adjust the pressure of the condensed liquid refrigerant by the amount needed to subcool the condensed liquid refrigerant by the particular amount. In some cases, the refrigeration system 102 can include sensors 104a-c that include, but are not limited to temperature sensors, pressure sensors, flow-rate sensors, position sensors, composition sensors, chemical sensors, alarm sensors, etc. In some cases, the sensors 104a-c may be used to determine unique parameters or points of the refrigeration system 102, components of the refrigeration system 102, and/or compositions (e.g., the refrigerant) used with the refrigeration system 102. In some examples, the sensors 104a-c can determine the points in real time. For instance, the sensors 104a-c may include pressure and temperature sensors that can determine the pressure values and the temperature values in real time. In some cases, the sensor 104b can sense the pressure of the condensed liquid refrigerant before its pressure is adjusted by throttling valve 108 and the sensor 104a can sense the pressure of the condensed liquid refrigerant after it exits liquid refrigerant receiver 106. In some cases, the sensor 104b may be a temperature sensor that can sense the temperature of the condensed liquid refrigerant before its pressure is adjusted by throttling valve 108. In some instances, the controller 100 can receive the sensed pressure and the sensed temperature and adjust the throttling valve 108 as needed to subcool the condensed liquid refrigerant by the particular amount based on the sensed pressure and temperature.

The local controller 100 can communicate with the throttling valve 108 and the sensors 104a-c (e.g., control the operation of throttling valve 108 and receive sensed temperatures and pressures from sensors 104a-c) via a direct (e.g., wired) or via a wired or wireless network or networks.

The wireless network(s) can be, for instance, a wide area network (WAN) such as the Internet, a local area network (LAN), a personal area network (PAN), a campus area network (CAN), or metropolitan area network (MAN), among other types of wireless networks. In some instances, the refrigerant system 102 or components of the refrigerant system 102 may be operatively coupled to the local controller 100 via a corresponding communication port (not explicitly shown). It is contemplated that the communication ports may be wired and/or wireless. When the communication ports are wireless, the communication port may include a wireless transceiver, and the local controller 100 may include a compatible wireless transceiver. It is contemplated that the wireless transceivers may communicate using a standard and/or a proprietary communication protocol. Suitable standard wireless protocols may include, for example, cellular communication, Lon, BACnet, Modbus, ZigBee, Bluetooth, WiFi, IrDA, dedicated short range communication (DSRC), EnOcean, or any other suitable wireless protocols, as desired.

The expansion valve 118 can adjust the pressure of the condensed liquid refrigerant. That is, expansion valve 118 can be operated by controller 100 via a direct connection or a wired or wireless network(s) to decrease the pressure of the subcooled liquid output from liquid refrigerant receiver 106. After flowing through the expansion valve 118, the liquid refrigerant can enter the coil or tubes of the evaporator 114. A fan 116 can circulate warm air from the enclosed space across the coil or tubes carrying the cold liquid refrigerant, which can cool the air and thus lower the temperature of an enclosed area. The warm air may also evaporate the liquid refrigerant so that the refrigerant is once again a saturated vapor. The saturated vapor can exit evaporator 114 and flow to the compressor 112, and the cycle can be repeated. As shown, the refrigerator system 102 can include the sensor 104c. In some cases, the sensor 104c can sense the pressure and temperature, respectively, of the saturated refrigerant vapor after it exits evaporator 114. The local controller 100 can receive the sensed pressure and temperature via a direct connection or a wired or wireless network from the sensor 104c and utilize the sensed pressure and temperature to control the superheating of the refrigerant vapor performed by compressor 112. FIG. 1 shows just one example of a refrigeration system. Numerous other configurations are contemplated. For example, a refrigeration system may include a rack of compressors that supply compressed refrigerant to each of two or more independently controlled refrigeration circuits of the refrigeration system that service two or more refrigeration cases. In some cases, a single local controller 100 may control such refrigeration system.

Figure 2:
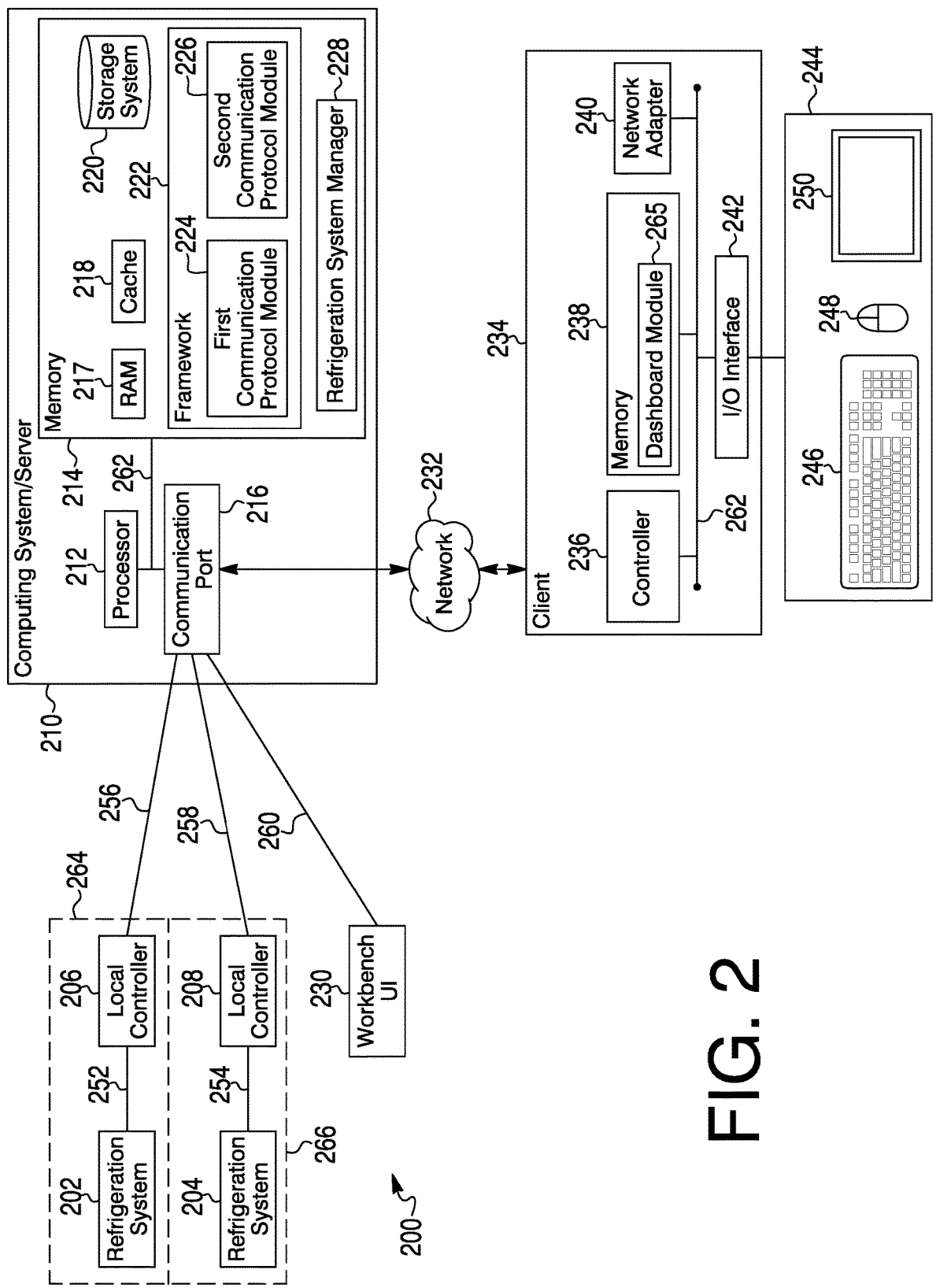
FIG. 2 is a schematic view of an illustrative refrigeration management system.

FIG. 2 is a schematic view of an illustrative refrigeration management system 200 that facilitates access to, control of, and/or external communication to/from disparate refrigeration systems. In the example shown, the refrigeration management system 200 may include refrigeration system 202 operatively coupled to a corresponding local controller 206 and refrigeration system 204 operatively coupled to a corresponding local controller 208. In some cases, the local controller 206 may be integrated into the refrigeration system 202 (as depicted by dashed line 264) and the local controller 208 may be integrated into the refrigeration system 204 (as depicted by dashed line 266). In other cases, the local controller 206 may be separate from the refrigeration system 202 and the local controller 208 may be separate from the refrigeration system 204.

As shown in FIG. 2, the refrigeration management system 200 may include a computing system/server 210. In the example shown, the computing system/server 210 can perform various communication and data transfer functions as described herein and can execute one or more application functions. The computing system/server 210 can be any of a wide variety of computing devices, such as a server computer, a desktop computer, a handheld computer, a tablet computer, mobile telephone or other mobile device, and the like. In some instances, the computing system/server 210 may be a Dell Edge Gateway 5100, a Lenovo ThinkServer TS150, a Supermicro SuperWorkstation 5039A-IL, a Fujitsu Primergy TX1310 M1, a HP Proliani Microserver Gen8, a Scan 3XS SER-T25, and/or an Asus TS500.

The components of the computing system/server 210 may include, but are not limited to, a processor 212, a system memory 214, a communication port 216, and a bus 262 that couples various system components including the processor 212, the system memory 214 and the communication port 216. In some cases, the computing system/server 210 may include other hardware and/or software components. Examples may include, but are not limited to: microcode, device drivers, redundant processing units, external disk drive arrays, RAID systems, tape drives, and data archival storage systems, etc.

When provided, the bus 262 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing system/server 210 may include a variety of computer system readable media. Such media may be any available media that is accessible by the computing system/server 210, and it may include volatile memory, non-volatile memory, removable and non-removable media.

The system memory 214 can include computer system readable media in the form of volatile memory, such as random access memory (RAM) 217 and/or cache memory 218. The computing system/server 210 may further include other removable/non-removable, volatile/non-volatile computer system storage media. By way of example only, storage system 220 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 262 by one or more data media interfaces.

In some cases, the processor 212 may execute instructions stored in the system memory 214. For instance, in some cases, a framework 222 may be stored in the system memory 214 configuring the processor 212 into a Java Application Control Engine (JACE). In some examples, the framework 222 may be a Niagara R2 version framework, a Niagara AX version framework, a Niagara 4 version framework, and so forth. As such, the computing system/server 210 may be a piece of hardware that runs a Java VM (Virtual Machine) to create a graphical user interface (GUI) from which a workbench and/or client (e.g., workbench UI 230 and client 234) can interact with the local controllers 206, 208 and thus refrigeration systems 202, 204. In some cases, the framework 222 may include a set of application program modules (e.g., software), such as a first communication protocol module 224 and a second communication protocol module 226. In some cases, the framework 22 may have an extensive API library (e.g., an Opus Refrigeration Library (ORL)) that includes modules for several additional protocols). Moreover, the framework may include an alarm portal as well as an operating system such as Linux, for example, and program data. According to various embodiments, the application program modules (e.g., the first and second communication protocol modules) may include mapping instructions and device template instructions. In some cases, the framework 222, including the first and second communication protocol modules, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

In some cases, the computing system/server 210 may communicate with a workbench UI 230 over a wired or wireless network 260 using a standard and/or a proprietary third communication protocol and communicate with the client over a network 232 using a standard and/or a proprietary fourth communication protocol. Such communication may occur via the communication port 216. In some instances, the network 232 may include a local area network (LAN) or a wide area network (WAN), or the connection may be made to an external computer (for example, through the Internet using an Internet Service Provider). Moreover, in some cases, the network 260 may be the same as the network 232. Additionally, the third and fourth communication protocols may also be the same.

In some cases, the computing system/server 210 may facilitate communication between the local controllers 206, 208 and the workbench UI 230 and the client 234. As such, a user may control the local controllers 206, 208 using the workbench UI 230 and/or the client 234. For instance, the communication port 216 may be connected to the local controllers 206, 208 through wired or wireless networks 256, 258. Local controllers 206, 208 may be connected via wire or wireless connections 252 and 254, respectively, to refrigeration systems 202 and 204. To help integrate disparate refrigeration systems or local controllers into a more cohesive building automation system, the framework 222 may configure the processor 212 to auto-discover points of the refrigeration systems (e.g., refrigeration systems 202 and 204) via the local controllers 206, 208. Because the local controllers 206 and 208 may use a different communication protocol (i.e., the first communication protocol and the second communication protocol), it is contemplated that the processor 212 may be configured to communicate over the communication port 216 using the first and second communication protocols. For example, the processor 212 may send an auto-discovery request on the communication port 216 using the BACnet protocol, which in the example shown, may cause the local controller 206 (assuming the local controller 206 is BACnet compatible and the first communication protocol is BACnet) to return points for the refrigeration system 202 to the processor 212. In some cases, the points may include, but are not limited to, temperature, pressure, alarms, and/or other details about components of the refrigeration system 202. The processor 212 may further send an auto-discovery request over the communication port 216 using a Modbus protocol, which in the example shown may cause the local controller 208 (assuming the local controller 208 is Modbus compatible and the second communication protocol is Modbus) to return point values for the refrigeration system 204 to the processor 212. More generally, the processor 212 may communicate with components of the refrigeration systems 202, 204 via the communication port 216 using an appropriate communication protocol. In some cases, a component of the refrigeration system 202 may use a first protocol with a first auto-discovery procedure and a component of the refrigeration system 204 may use a second protocol with a second auto-discovery procedure.

Once setup, a first communication protocol module 224 (i.e., a BACnet protocol module) may provide instructions to the processor 212 for mapping the received points from the local controller 206 of the refrigeration system 202 to common points using a device template. In some cases, the device template may be a list of predefined points with tags. As such, the template allow the processor 212 to identify a common point that corresponds to a received point from local controller 206, and map the received point to the common point. The collection of mappings may then be stored in the memory 214. Similarly, the second communication protocol module 226 (i.e., a Modbus protocol module) may provide instructions to the processor 212 for mapping the received points of the refrigeration system 204 to the same common points using a device template and storing the mappings in the memory 214. The framework 222 may then provide instructions to the processor 212 to group the common points of the first and second refrigeration systems into a framework object and install the framework object as a refrigeration system manager 228.

Now that the computing system/server 210 has the refrigeration system manager 228 installed, it can collect data from and send control settings to the local controllers 206 and 208. For instance, the refrigeration system manager 228 may provide instructions to the processor 212 to generate a GUI on the workbench UI. In some cases, as stated herein, the framework may be a Niagara 4 version framework. As such, the GUI may utilize HTML\5 which may provide interoperability with current web design standards. The use of HTML may allow a user to modify the graphical layout of the GUI and the HTML\5 aspects of the GUI may allow the GUI to be utilized on mobile devices. In some examples, the user at the workbench UI may use the GUI to request the values for the points of the refrigeration systems 202 and 204. In some cases, the values for the points may include, but are not limited to temperature values, pressure values, and alarm statuses/active alarms in relation to components of the refrigeration systems 202 and 204. Accordingly, the processor 212 may use the mappings from the refrigeration system manager 228 to seamlessly translate the requests from the third communication protocol into the first and second protocols (i.e., the BACnet and Modbus protocols) and send the requests to the local controllers 206, 208. The local controllers 206, 208 may then send the point values in response to the requests and the processor 212 may convert the point values into the third communication protocol and populate the GUI on the workbench UI 230. The requests may be from a user, but also may be automatic requests to update the point values when they change, or provide updated point values at a certain time interval, such as every 1 second.

Additionally, the refrigeration system manager may include analytics software that allows a user to analyze data that is pulled in from the refrigeration systems 202 and 204. Essentially, algorithms and rules can be applied to the points that are pulled into the refrigeration system manager 228. This may provide analytic solutions to the pulled in data in real-time or on a historical basis. For instance, in some examples, an aggregated number of active alarms of the refrigeration systems 202 and 204 may be calculated and displayed through the GUI at the workbench UI 230. In another example, the received values of points from the refrigeration systems 202 and 204 may be analyzed to identify lower performing components from the refrigeration systems 202 and 204. In some cases, the lower performing components may be displayed through the GUI at the workbench UI 230. As such, the user at the workbench UI 230 may observe the analytic solutions over the GUI and send point settings and/or point values for the components of the refrigeration systems 202 and 204 in response. Accordingly, the processor 212 may translate the point settings and values from the third communication protocol into the BACnet and Modbus protocols (in this example) and send the commands to the local controllers 206, 208. The local controllers 206, 208 may then set the components of the refrigeration systems 202 and 204 to the point settings and values.

In some cases, as stated herein, the client 234 may communicate with the computing system/server 210 over the network 232. As such, the client 234 may include a network adapter 240 to facilitate such communication. The client 234 provides only an illustration of one implementation and does not imply any limitations with regard to the environments in which different embodiments may be implemented. Many modifications to the client 234 may be made based on design and implementation requirements. Examples of computer systems, environments, and/or configurations that may be represented by the client 234 include, but are not limited to, desktop computers, laptop computers, server computers, thin clients, thick clients, multiprocessor systems, microprocessor-based systems, and distributed cloud computing environments. In some cases, the client 234 merely provides a user interface for an installer or the like to interact with the refrigeration system manager 228 of the computing system/server 210. In some cases, the user interface function of the client 234 may be implemented by the workbench UI 230, and the client 234 may not be needed.

In some cases, components of the client 234 may include a controller 236, a memory 238, an I/O interface 242, and the network adapter 240. Each of the components of the client 234 may be connected to an internal bus 262 that includes data, address, and control buses, to allow the components of the client 234 to communicate with each other via the bus 262.

In some cases, the controller 236 may be a central processing unit (CPU) that executes an operating system and computer software executing under the operating system. In some cases, the memory 238 may be configured and operate similar to the system memory 214. For instance, the memory 238 may include computer system readable media in the form of volatile memory, such as random access memory (RAM) and/or cache memory. In addition, the memory 238 may also include a storage device configured to read from and write to a non-removable, non-volatile magnetic media.

In some examples, the framework 222 may be configured an application programming interface (API) and software development kit (SDK) that enables the modules and applications stored on remote devices to access the data from the framework 222 and the refrigeration system manager 228.

As such, a dashboard module 265 may be developed and stored in the memory 238. In some cases, the dashboard module 265 may provide instructions to the controller 236 that when executed, allows the controller 236 to reference the common points and the mappings from the refrigeration system manager 228 to assemble a dashboard screen that displays the values of the points of the refrigeration systems 202 and 204.

For example, external devices 244 may include a keyboard 246, a mouse 248, and a display 250, which enables a user to interact with the client 234 via I/O interface 242. In some cases, the dashboard module 265 may provide instructions to the controller 236 to generate a dashboard screen on the display 250 that displays the refrigeration systems that the computing system/server 210 manages (e.g., the refrigeration systems 202 and 204). Accordingly, the user may use the one or more of the external devices 244 to request the values for the points of the refrigeration systems 202 and 204 from the computing system/server 210 using the fourth communication protocol. Similar to the example described in regard to the communication between the workbench UI and the computing system/server 210, the processor 212 may use the mappings to translate the requests made in the fourth communication protocol into the BACnet and Modbus protocol (in this example) and translate the point values back into the fourth communication protocol. However, in this example, the dashboard module 265 may dictate the format of how the point values are displayed on the display 250. For instance, the dashboard module 265 may provide instructions to the controller 236 to display a dashboard screen that displays the values of a set of points of the refrigeration system 202 concurrently with the values of a set of points of the refrigeration system 204. In this configuration, the dashboard module 265 and therefore, the dashboard, may be independent of the underlying system (e.g. the refrigeration management system 200), and may be deployed on-premises or in the cloud. However, this is just one example and the dashboard module 265 may instruct the controller 236 to display the dashboard screen differently. Moreover, the dashboard module 265 may include detailed instructions for how each screen of the dashboard is to be displayed. Furthermore, in some instances, the dashboard may be updated with real-time values whenever there is a change in the configuration in the underlying system (e.g. the framework 222, the refrigeration system manager 228, and/or the refrigeration systems 202 and 204) or the value of a point changes.

Figure 3:
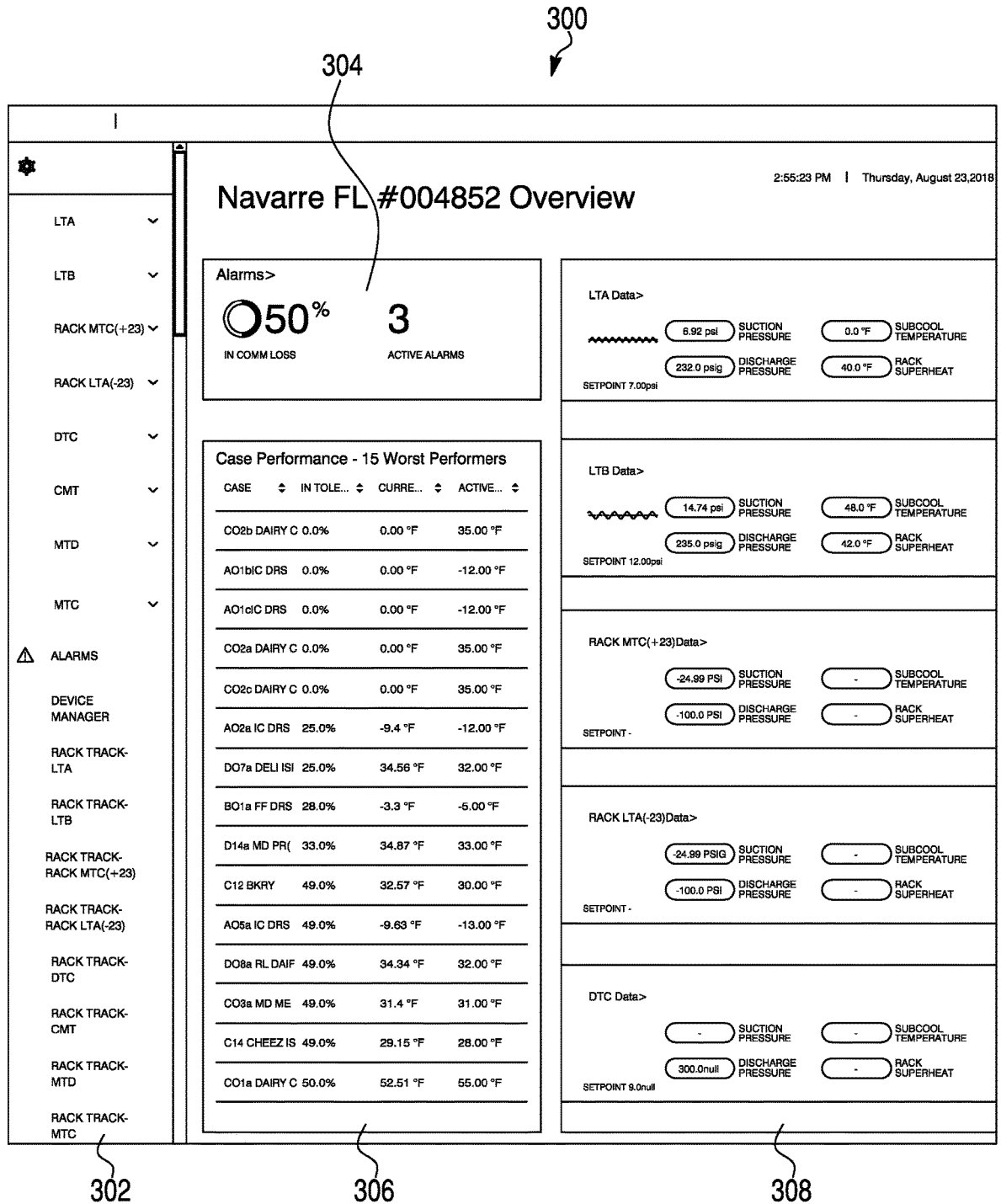

FIG. 3 depicts an illustrative dashboard screen 300 generated for a plurality of refrigeration systems (LTA, LDB, and so on). In some cases, a refrigeration system manager and a dashboard module, as described herein, may be used to generate the dashboard screen 300. In some instances, the dashboard screen 300 (and all the other screens described herein) may be web-based and facilitate monitoring and control over the refrigeration systems available in the refrigeration management system. In this example, the dashboard screen 300 may include a navigation panel 302 that lists all the refrigeration systems and other components available in the refrigeration management system. For instance, icons corresponding to particular refrigeration systems such as "LTA", "LTB", "RACK MTC (+23)", RACK LTA (−23)", and so on, may be located in the navigation panel 302. In this example, each icon may be selected to display a refrigeration system overview details screen. The screen 300 may further include an alarm overview panel 304 that shows the total number of active alarms in the refrigeration management system. In some examples, an aggregated number of active alarms of the refrigeration systems may be calculated and displayed. In this case, the number of active alarms is 3 and the percentage for the number of communication lost alarms is 50%. Additionally, the alarm overview panel 304 may include an alarm link that when selected may display an alarm screen (e.g., alarm screen 1500, depicted in FIG. 15) that displays the active alarms of the refrigeration systems. The screen 300 may further include a summary of the case performance panel 306. As discussed herein, point values received from refrigeration systems may be analyzed to identify lower performing components from the refrigeration systems. Accordingly, in this example, the case performance panel 306 may list the top 15 worst performing cases across in the management system. The screen 300 may further include a parameters/point values of the refrigeration systems panel 308. In some cases, panel 308 may provide a brief overview of each refrigeration system (e.g., "LTA", "LTB", "RACK MTC (+23)", RACK LTA (−23)"). In some cases, the brief overview may include a display of the parameters/point values such as, for example, Suction Pressure, Discharge Pressure, Subcool Temperature and Rack Supplement for each refrigeration system. In some instance, the names of the refrigeration systems may be links that when selected, display a refrigeration system overview details screen for the corresponding refrigeration system. In some cases, the refrigeration system overview details screens may include more details about the refrigeration system in addition to the parameter/point values. Panel 308 may also provide a trend graph for the Suction Pressure point against its set point for the last 24 hours. Moreover, a user can obtain the graph for any point available by clicking on that point.

Figure 4:
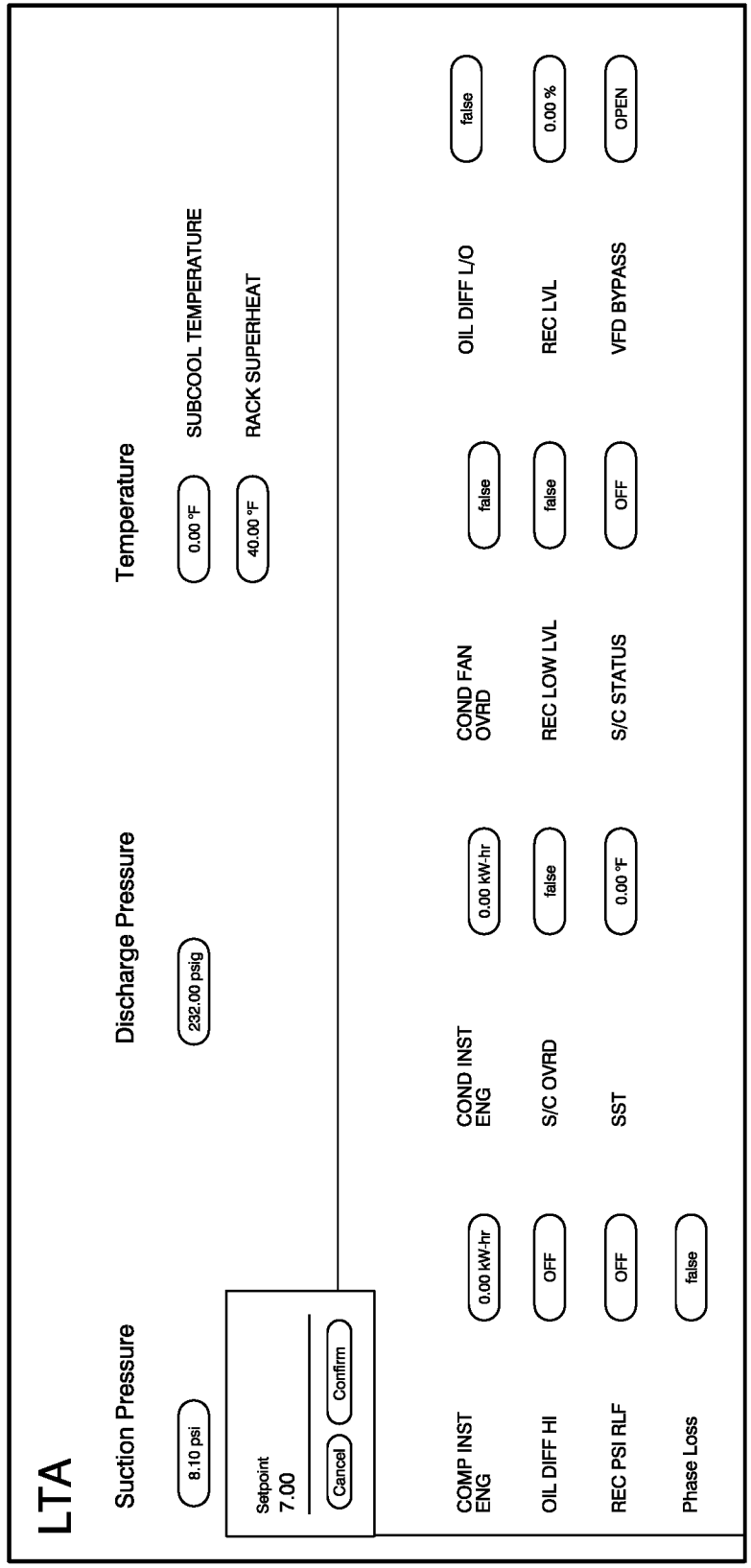
Figure 5:
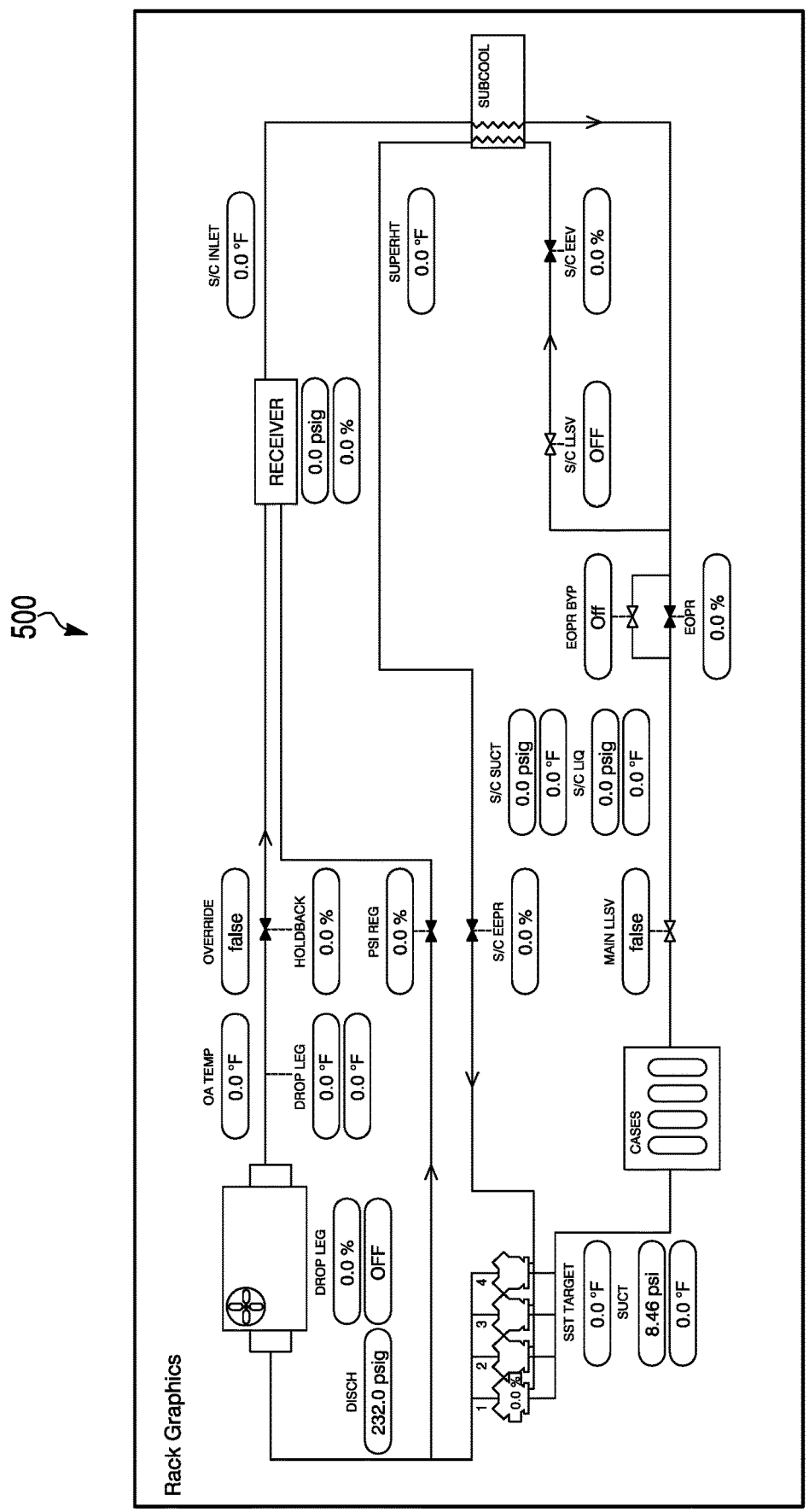
Figure 6:

In some cases, a user can navigate to a refrigeration system overview details screen by selecting a refrigeration system on the dashboard screen 300, such as by selecting an icon from the navigation panel 302 or by selecting the name link of a refrigeration system from the panel 308. The illustrative refrigeration overview detail screens may have three major sections that are shown in FIGS. 4-6. Turning first to FIG. 4, an example of a refrigeration system points section screen 400 is shown. In this example, the current values and statuses of the points for the "LTA" refrigeration system are provided. In some cases, the points section screen 400 may be updated automatically and the set points for the points of the "LTA" may be updated by a user.

Turning to FIG. 5, an example of a graphical representation screen 500 of a refrigeration system is shown. In this example, similar to the points section screen 400, the graphical representation screen 500 may also show the current values and statuses of the points for a refrigeration system. Moreover, the graphical representation screen 500 may be updated automatically and the set points for the points of the refrigeration system may be changed by a user by selecting a given point.

Turning to FIG. 6, a refrigeration system compressor details screen 600 is shown. In some cases, the screen 600 may provide the fixed and variable compressor details for a particular refrigeration system. In some instances, a user can navigate to a refrigeration system history view to visualize the trend of point values for a particular refrigeration system from any of the screens 400, 500, and 600. Moreover, a user can add any history point to plot the trend.

FIGS. 7-14 provide example screens regarding circuits for a particular refrigeration system. Each refrigeration system in the management system may contain one or multiple circuit groups. A circuit group can be accessed by clicking a refrigeration system 102 of FIG. 1 in the navigation panel 302 of FIG. 3. By clicking on a refrigeration system, a drop down menu may provide the available Circuit Group(s) in the selected refrigeration system. By selecting a Circuit Group from the drop down menu, as shown in FIG. 7, a circuit status screen 700 may be displayed. In this example, screen 700 may contain details about all the circuits and the cases associated with the selected Circuit Group. As depicted, the circuit status screen 700 provides a table that groups all of the circuits with their respective points associated with the selected Circuit Group. By selecting a circuit, as shown in FIG. 8, a circuit details screen 800 may be displayed. In this case, circuit "A01 IC DRS" has been selected. As such, screen 800 displays a detailed summary of the point values for the "A01 IC DRS" circuit. For instance, the screen 800 may allow a user to access Configuration, Data Logs and Defrost Schedule for the "A01 IC DRS" circuit.

Figure 9:
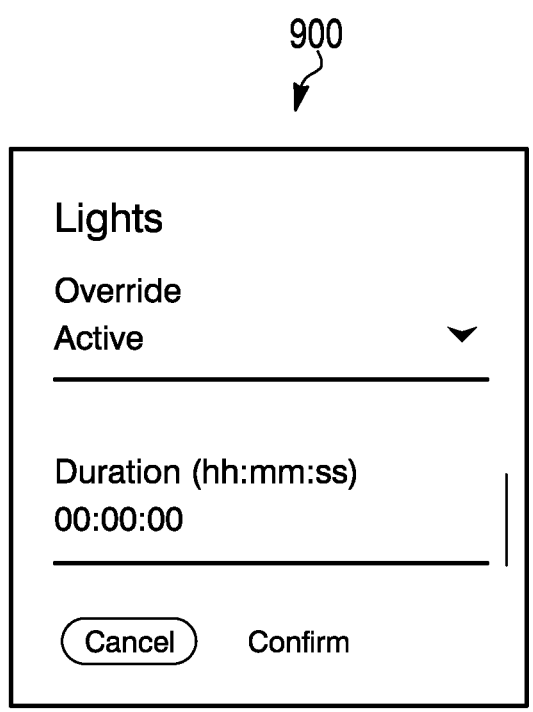
Figure 12A:
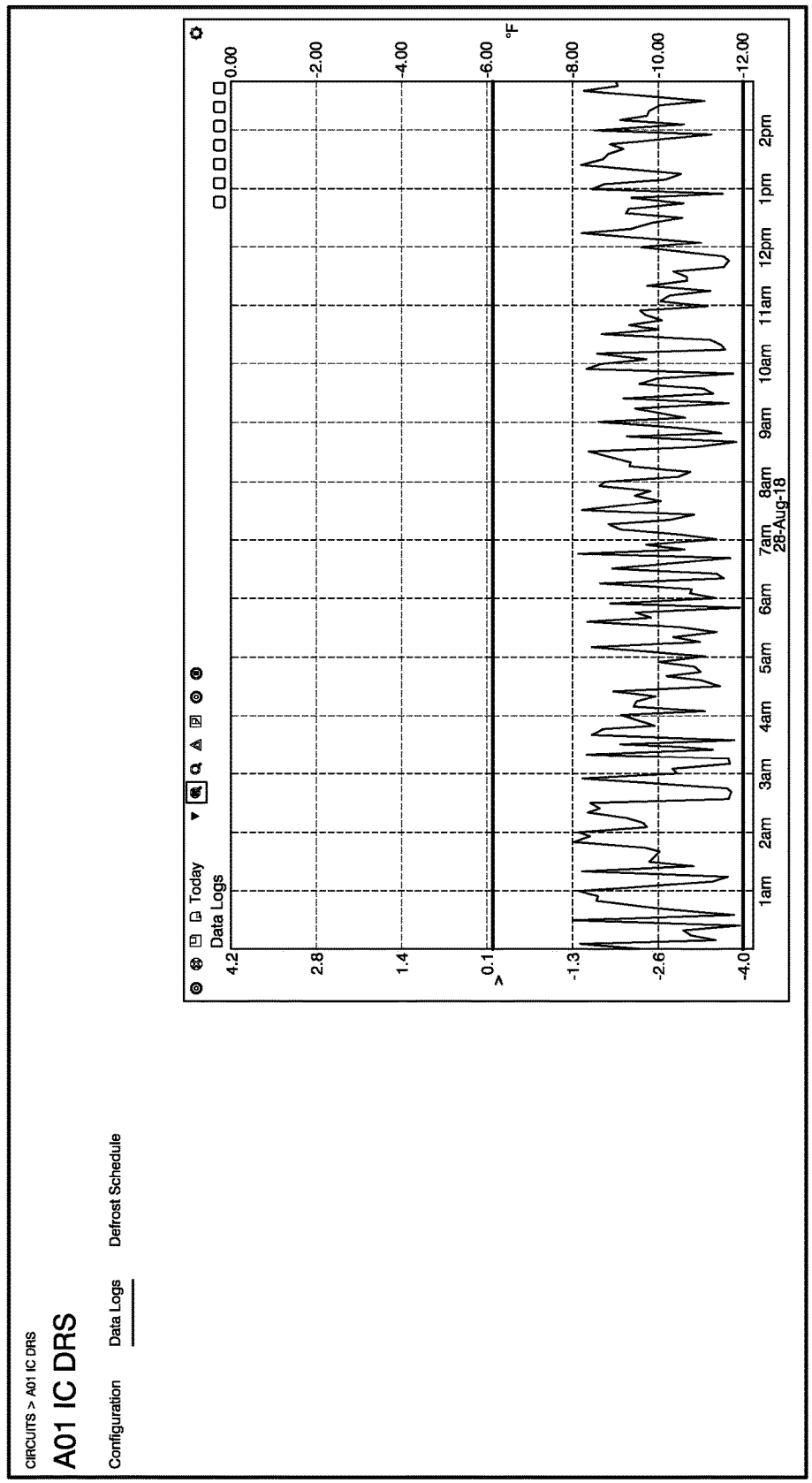
Figure 12B:
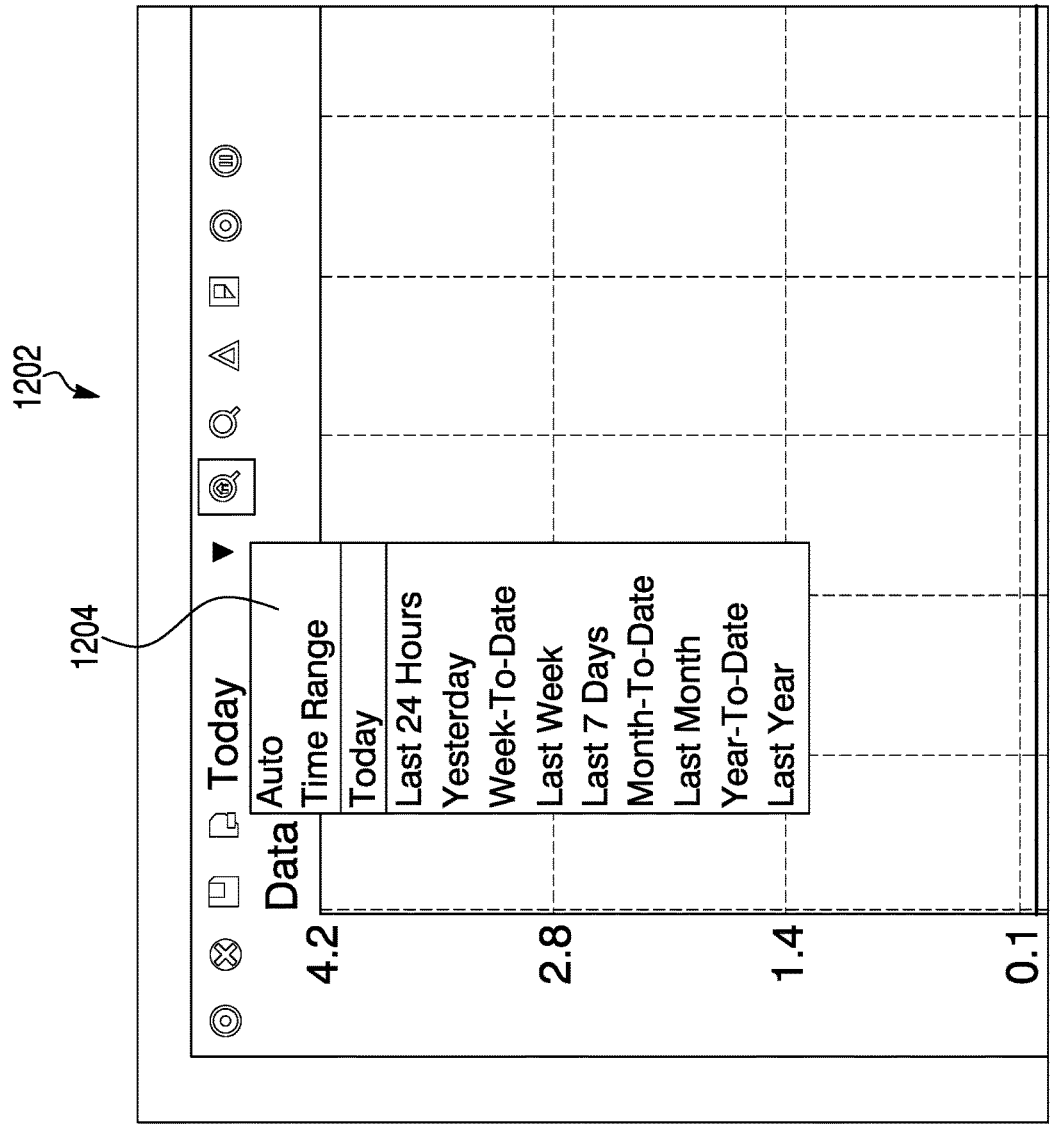
Figure 14:
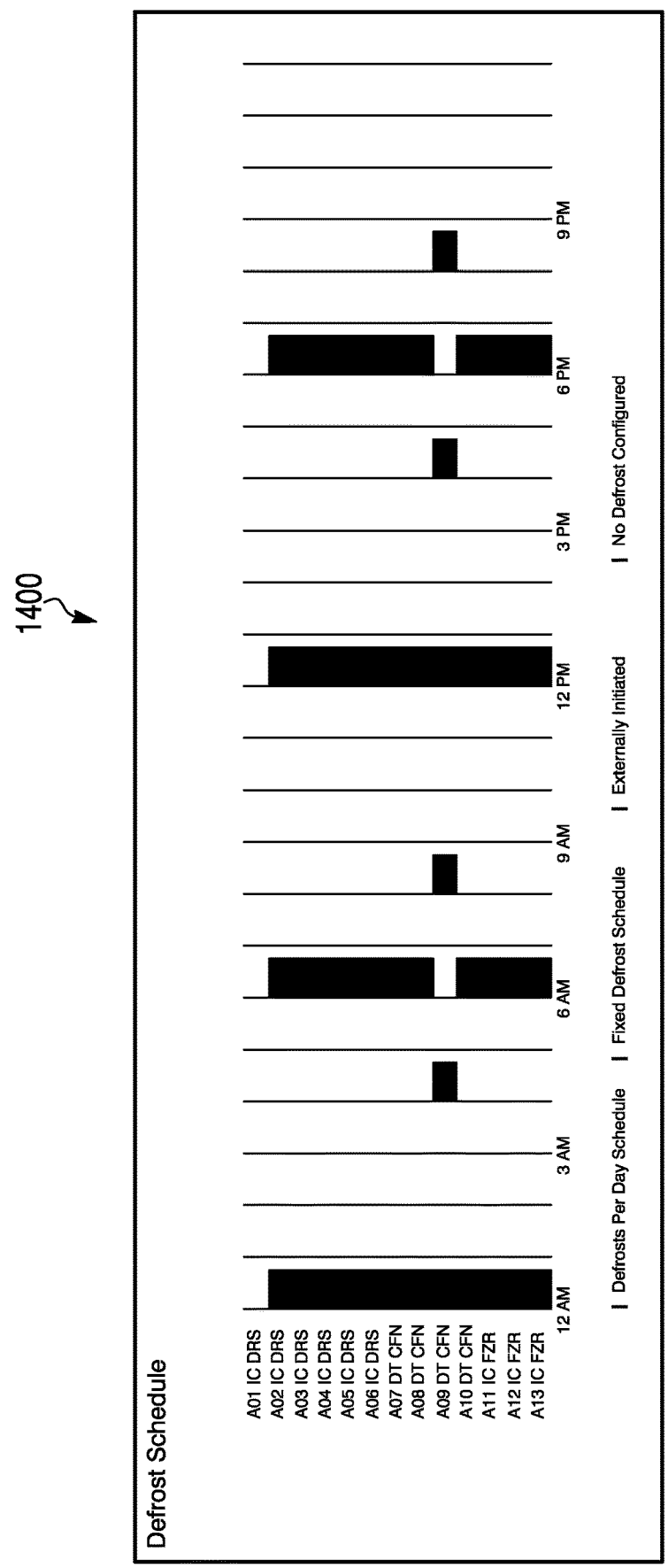

Turning to FIG. 9, a case lights screen 900 is shown. In some cases, the circuit status, shown in FIG. 7, may group all the monitoring points except case lights. As such, if case lights are present on a circuit, a user may use screen 900 to configure an override and duration for the case lights. FIG. 10 depicts a temperature control setting screen 1000. In some cases, the screen 1000 may allow a user to modify the various temperature parameters for a selected circuit. FIG. 11 depicts a defrost control setting screen 1100. In some cases, the screen 1100 allows a user to modify the various defrost control parameters for a selected circuit. FIG. 12A depicts a data log screen 1200. In some cases, the data log screen 1200 may show the history for some of the points on a selected circuit (e.g., the "A01 IC DRS" circuit). FIG. 12B depicts a screen 1202 having a drop down menu 1204 that allows a user to select a time frame to check the history of the points. FIG. 13 depicts a circuit case details screen 1300. In some cases, the circuit case details screen 1300 may allow a user to find all the cases and the associated details included in the selected circuit. FIG. 14 depicts a defrost schedule screen 1400. The defrost schedule screen 1400 may allow a user to monitor a defrost schedule for a circuit group. The defrost schedule screen 1400 may provide schedule details for all the circuits in the selected circuit group.

FIG. 15 depicts an alarm details screen 1500. In some cases, the alarm details screen 1500 may provide an overview of the alarms or active alarms in the management system. In some cases, the alarm details screen 1500 may be generated upon selection of a link from the alarm overview panel 304, shown in FIG. 3. In this example, users can monitor an alarm state, an acknowledgement state, an alarm source, an alarm class, and message text displayed for the alarms.

FIG. 16 depicts a device manager screen 1600. In some cases, the device manager screen 1600 may provide details of virtually all the devices discovered under a network drive in the system. For instance, in this example, the device manager screen 1600 may provide an overview of the health of the device and health of the network in general.

Figure 17A:
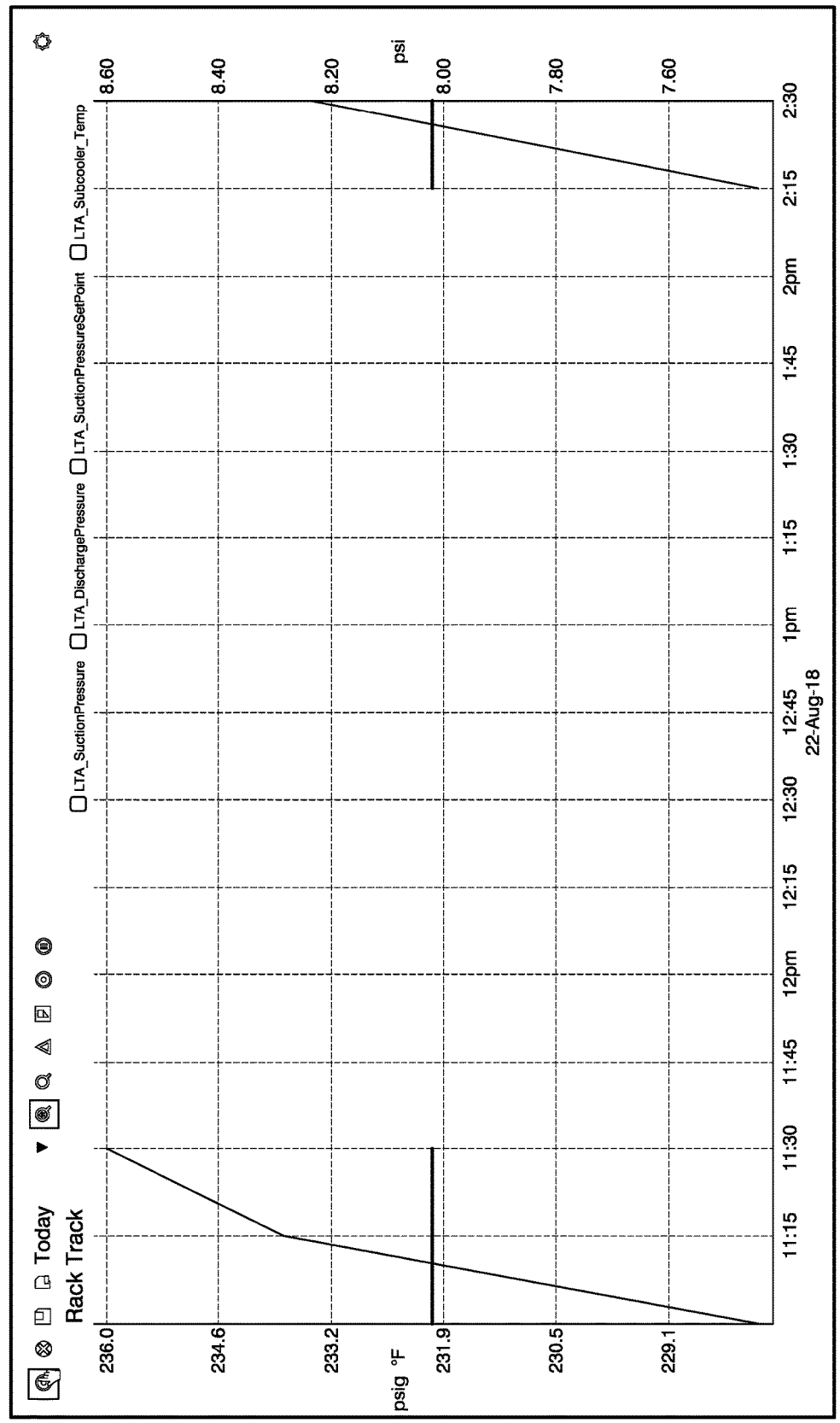
Figure 17B:
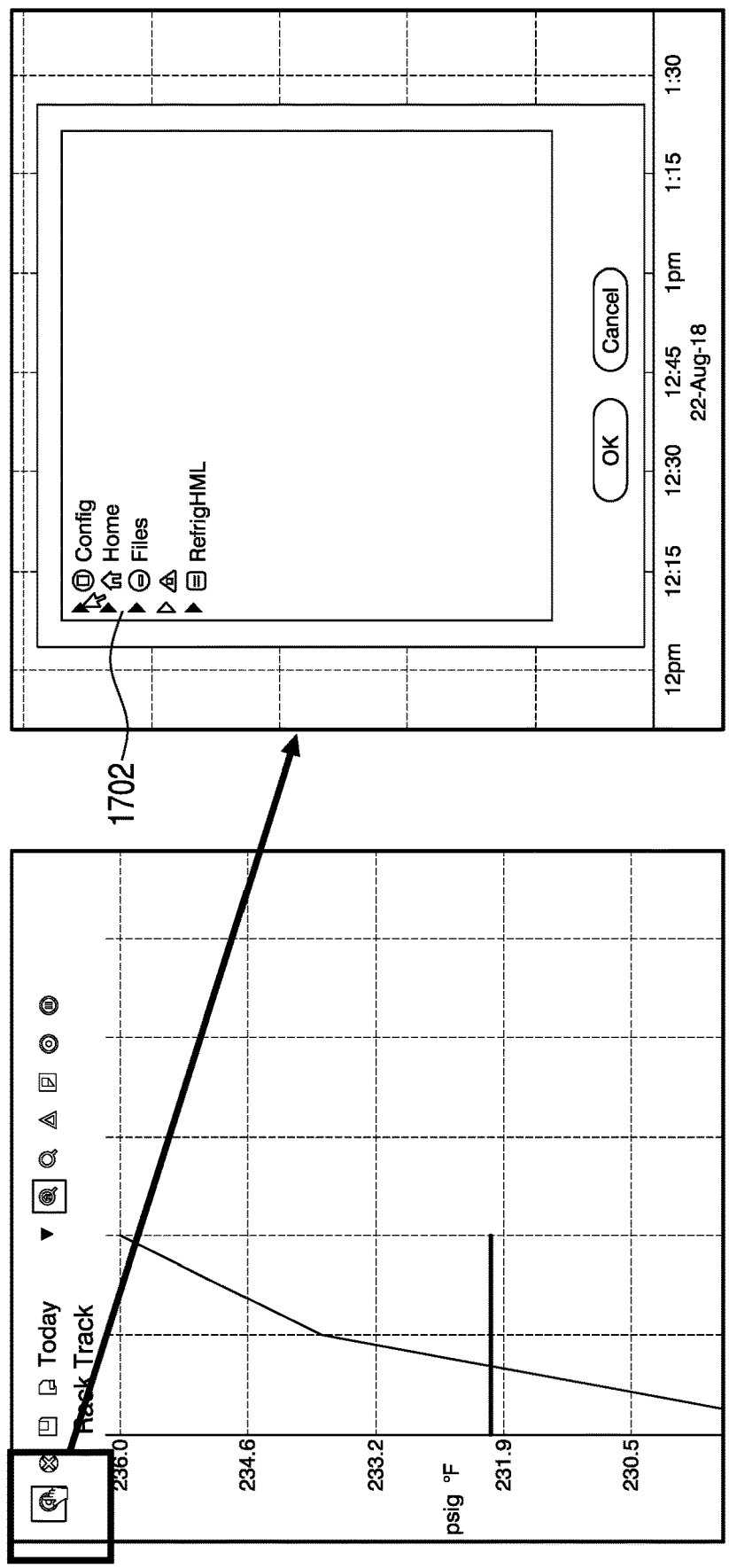

FIG. 17A depicts a refrigeration system trend graph screen 1700 that may provide a detailed history and logs for various important points associated with the selected refrigeration system. As shown in FIG. 17B, a user can load a graph for any point available by selecting it from the drop-down list 1702.

This list of dashboard screens is by no means exhaustive. In some cases, the dashboard screens may include other configurations that facilitate clear representation of parameters, points, and statuses of refrigeration systems. As such, the final design may be optimized and tailored for specific systems and users.

Figure 18:
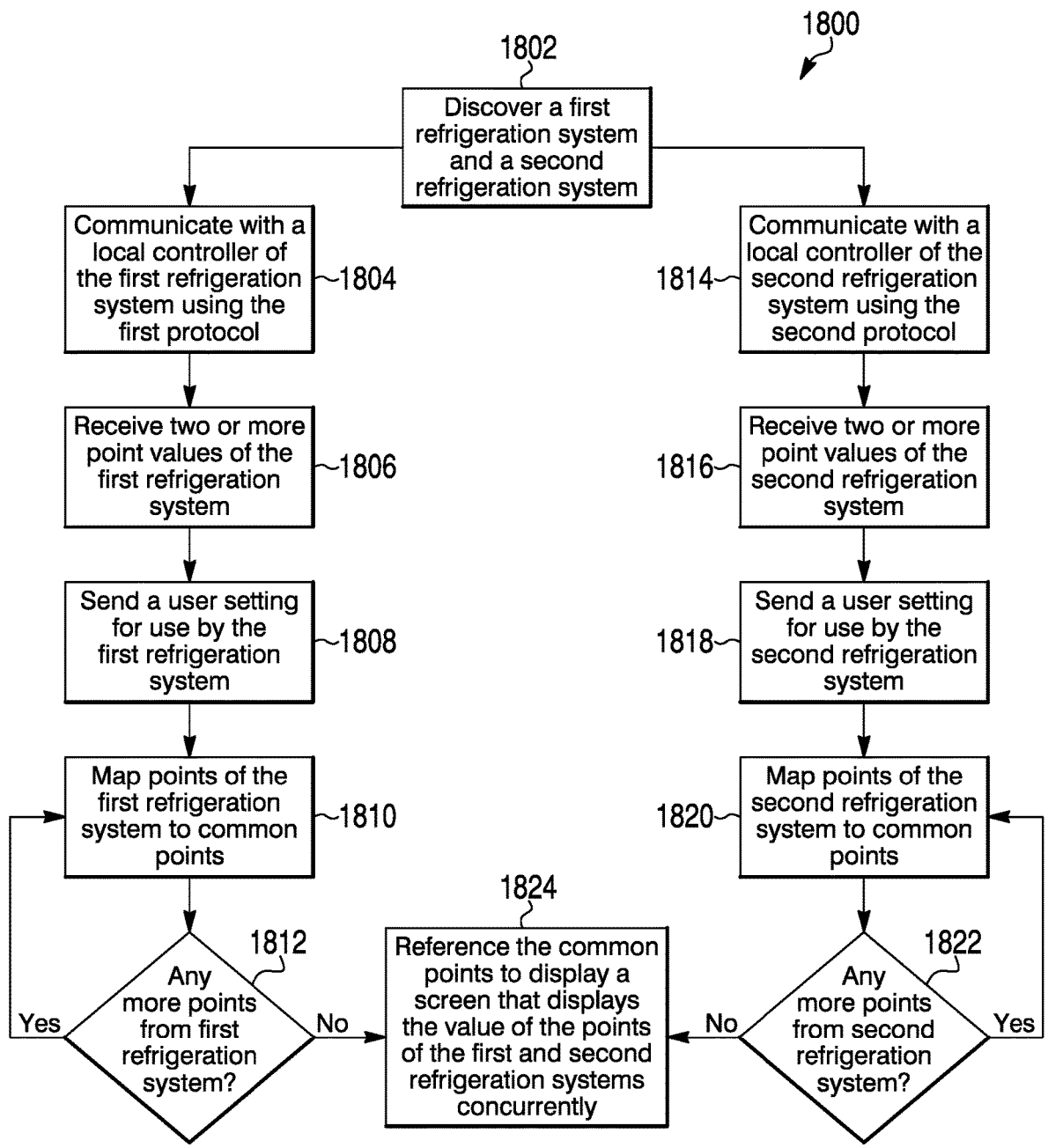
FIG. 18 is a flow diagram showing an illustrative method.

FIG. 18 illustrates an illustrative method 1800 for a method for managing two or more refrigeration systems that each are controlled by a corresponding local controller and the local controller for a first refrigeration system of the two or more refrigeration systems uses a first communication protocol and the local controller for a second refrigeration system of the two or more refrigeration systems uses a second communication protocol that is different than the first communication protocol. The method 1800 begins at step 1802, where the first and second refrigeration systems are discovered. In some cases, steps 1804-1812 may be performed concurrently or in parallel with steps 1814-1822. At step 1804, the first protocol is used to communicate with the first refrigeration system, and at step 1814, the second protocol is used to communicate with the second refrigeration system. At step 1806, two or more point values are received from the first refrigeration system, and at step 1816, two or more point values are received from the second refrigeration system. At step 1808, a user setting is sent for use by the first refrigeration system, and at a step 1818, a user setting is sent for use by the second refrigeration system. At step 1810, points of the first refrigeration system are mapped to common points, and at step 1820, points of the second refrigeration system are mapped to common points. Step 1812 determines if there are any more points from the first refrigeration system that need to be mapped to a common point, and step 1822 determines if there are any more points from the second refrigeration system that need to be mapped to a common point. If it is determined that there are points from the first refrigeration system that need to be mapped to a common point, step 1810 is repeated. Likewise, if it is determined that there are points from the second refrigeration system that need to be mapped to a common point, step 1820 is repeated. However, if it determined that there are no points from the first refrigeration system that need to be mapped to a common point, and there are no points from the second refrigeration system that need to be mapped to a common point, at step 1824, the common points may be referenced to display a screen that displays the value of the points of the first and second refrigeration systems concurrently. The method shown in FIG. 18 is merely illustrative.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for managing two or more refrigeration systems that each are controlled by a corresponding local controller, wherein the local controller for a first refrigeration system of the two or more refrigeration systems uses a first communication protocol and the local controller for a second refrigeration system of the two or more refrigeration systems uses a second communication protocol, wherein the first communication protocol is different from the second communication protocol, the method comprising:

communicating with the local controller of the first refrigeration system using the first communication protocol to:
receive values of two or more points of the first refrigeration system, wherein at least one of the two or more points represents a temperature and at least another of the two or more points represents a pressure; and
send one or more user settings for use by the first refrigeration system;
communicating with the local controller of the second refrigeration system using the second communication protocol to:
receive values of two or more points of the second refrigeration system, wherein at least one of the two or more points represents a temperature and at least another of the two or more points represents a pressure; and
send one or more user settings for use by the second refrigeration system;
mapping the two or more points of the first refrigeration system to a defined set of common points;
mapping the two or more points of the second refrigeration system to the defined set of common points; and
referencing the defined set of common points to display a screen that displays the value of one or more points of the first refrigeration system concurrently with the value of one or more points of the second refrigeration system.

2. The method of claim 1, wherein:
the screen displays the value of one or more points of the first refrigeration system that represents a temperature concurrently with the value of one or more points of the second refrigeration system that represents a temperature; or
the screen displays the value of one or more points of the first refrigeration system that represents a pressure concurrently with the value of one or more points of the second refrigeration system that represents a pressure; or
the screen displays the value of one or more points of the first refrigeration system that represents a pressure concurrently with the value of one or more points of the second refrigeration system that represents a temperature.

3. The method of claim 1, wherein:
the screen is a dashboard screen that includes two or more defined panel regions, wherein a first one of the two or more panel regions displays the value of one or more points of the first refrigeration system concurrently with the value of one or more points of the second refrigeration system; and
the method further comprises:
displaying a first link in the first one of the panel regions of the dashboard screen that, when selected by a user, displays a first screen that displays the value of at least one other of the two or more points of the first refrigeration system; and
displaying a second link in the first one of the panel regions of the dashboard screen that, when selected by the user, displays a second screen that displays the value of at least one other of the two or more points of the second refrigeration system.

4. The method of claim 3, further comprising displaying a trend graph of the value of one or more points of the first refrigeration system in the first one of the two or more panel regions.

5. The method of claim 3, further comprising:
communicating with the local controller of the first refrigeration system using the first communication protocol to receive one or more active alarms of the first refrigeration system; and communicating with the local controller of the second refrigeration system using the second communication protocol to receive one or more active alarms of the second refrigeration system.

6. The method of claim 5, further comprising:
calculating an aggregated number of active alarms of the first refrigeration system and the second refrigeration system;
displaying the aggregated number of active alarms in a second one of the panel regions of the dashboard screen; and
displaying an alarm link in the second one of the panel regions of the dashboard screen that, when selected by a user, displays an alarm screen that displays the active alarms of the first refrigeration system and/or the active alarms of the second refrigeration system.

7. The method of claim 3, wherein a third panel of the dashboard screen includes a navigation panel that displays a first shortcut to more detailed information about the first refrigeration system and a second shortcut to more detailed information about the second refrigeration system.

8. The method of claim 1, wherein the screen is web-based and facilitates monitoring and control over both the first refrigeration system and the second refrigeration system via a common interface from a remote location.

9. The method of claim 1, further comprising analyzing the received values of the two or more points of the first refrigeration system and the received values of the two or more points of the second refrigeration system to identify lower performing components of the first refrigeration system and the second refrigeration system.

10. A refrigeration manager system comprising:
two or more controllers each configured to control a refrigeration system over a network, wherein a first controller of the two or more controllers communicates with a first refrigeration system using a first protocol and a second controller from the two or more controllers communicates with a second refrigeration system using a second, different, protocol;
a computing system operatively coupled to the two or more controllers and configured to:
normalize data from the first controller formatted under the first protocol and data from the second controller formatted under the second protocol into commonly formatted data; and
process the commonly formatted data and generate a dashboard that includes operating parameters and statuses for components of the first refrigeration system and the second refrigeration system, wherein the dashboard is formatted to provide common layout screens for the first refrigeration system and the second refrigeration system when displayed on a display.

11. The refrigeration manager system of claim 10, wherein the dashboard includes a consolidated system summary screen for the first refrigeration system and the second refrigeration system that includes an alarm status portion for components of the first and second refrigeration systems and an overview status performance portion of the first and second refrigeration systems.

12. The refrigeration manager system of claim 10, wherein the network comprises an intranet that confines communication between the first controller and the first refrigeration system and the second controller and the second refrigeration system to a structure.

13. The refrigeration manager system of claim 12, wherein:

the computing system facilitates control over both the first and second refrigeration systems using the dashboard; or
the dashboard is web based and facilitates control over both the first and second refrigeration systems remote from the structure.

14. The refrigeration manager system of claim 10, wherein:
the first and second refrigeration systems are distributed across an enterprise and the dashboard facilitates monitoring of the components of the first and second refrigeration systems across the enterprise; and
based on the monitoring of the components of the first and second refrigeration systems across the enterprise, trend data is analyzed to identify faulty components of the first and second refrigeration systems.

15. The refrigeration manager system of claim 10, wherein:
the first and second refrigeration systems comprise refrigeration rack systems; and
the components of the first and second refrigeration systems comprise circuits and condensers.

16. The refrigeration manager system of claim 10, wherein the computing system is further configured to tag the components and points of the first and second refrigeration systems.

17. The refrigeration manager system of claim 10, wherein the first and second refrigeration systems comprise legacy refrigeration systems and the computing system has access to model contextual information that allows the computing system to normalize the data from the first and second controllers into the commonly formatted data.

18. A non-transitory computer system readable medium having stored thereon a program code for use by a computing device, the program code causing the computing device to execute a method for creating a dashboard comprising:
creating common layout screens for displaying operating parameters and statuses for components of a first refrigeration system and a second refrigeration system; and
wherein:
the common layout screens include a consolidated system summary screen for the first refrigeration system and the second refrigeration system; and
the consolidated system summary screen comprises:
an alarm status portion for the components of the first and second refrigeration systems;
an overview status performance portion of the first and second refrigeration systems;
a system selection portion, having icons, indicating a system, which are configured to produce a dropdown menu when selected that allows selection of individual components of a selected system; and
a case performance portion that provides worst performing components of the first and second refrigeration systems.

19. The non-transitory computer system readable medium of claim 18, wherein:
the overview status performance portion comprises system intake pressure, system discharge pressure, system temperature, and system discharge temperature; and
the alarm status portion comprises a number indicating an amount of components from the first and second refrigeration systems that are currently producing an alarm.

20. The non-transitory computer system readable medium of claim 19, wherein the dashboard is configured to produce a common layout screen having detailed information regarding operating parameters and statuses for a component of the first and second refrigeration systems when an icon representing the component is selected from anywhere on the consolidated system summary screen.

* * * * *